(12) United States Patent
Zhou

(10) Patent No.: US 10,948,759 B2
(45) Date of Patent: Mar. 16, 2021

(54) IN-VEHICLE TOUCH DISPLAY DEVICE

(71) Applicant: WUHAN CHINA STAR OPTOELECTRONICS TECHNOLOGY CO., LTD., Hubei (CN)

(72) Inventor: Zheng Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/609,477

(22) PCT Filed: Sep. 25, 2019

(86) PCT No.: PCT/CN2019/107785
§ 371 (c)(1),
(2) Date: Oct. 30, 2019

(87) PCT Pub. No.: WO2020/258551
PCT Pub. Date: Dec. 30, 2020

(65) Prior Publication Data
US 2020/0409205 A1    Dec. 31, 2020

(30) Foreign Application Priority Data

Jun. 25, 2019 (CN) .......................... 201910553055.8

(51) Int. Cl.
*G02F 1/1333* (2006.01)
*G02F 1/13357* (2006.01)
(Continued)

(52) U.S. Cl.
CPC .... *G02F 1/13338* (2013.01); *G02F 1/133308* (2013.01); *G02F 1/133603* (2013.01);
(Continued)

(58) Field of Classification Search
CPC ......... G02F 1/133308; G02F 1/133603; G02F 2001/133311; G02F 2001/133317; G02F 2001/133325
See application file for complete search history.

(56) References Cited

U.S. PATENT DOCUMENTS

| 5,583,681 A | 12/1996 | Shioya et al. |
| 8,026,966 B2 * | 9/2011 | Altice ............... H01L 27/14656 348/294 |

(Continued)

FOREIGN PATENT DOCUMENTS

| CN | 105938265 A | 9/2016 |
| CN | 206710745 U | 12/2017 |

(Continued)

*Primary Examiner* — Dung T Nguyen
(74) *Attorney, Agent, or Firm* — Mark M. Friedman

(57) ABSTRACT

The present invention provides an in-vehicle touch display device. The in-vehicle touch display device includes a backlight module, a touch display module, and a sealant. The touch display module is placed over the backlight module. The touch display module includes a touch screen, an upper polarizing film, a liquid crystal layer, and a lower polarizing film sequentially stacked on each other. The sealant joins the backlight module and the touch display module together. The sealant includes two protrusions protruding between the backlight module and the touch display module. An adhesive layer is positioned on a side surface of each protrusion facing the lower polarizing film.

17 Claims, 1 Drawing Sheet

(51) Int. Cl.
*B60K 35/00* (2006.01)
*G06F 3/041* (2006.01)

(52) U.S. Cl.
CPC ...... *B60K 35/00* (2013.01); *B60K 2370/1438* (2019.05); *B60K 2370/816* (2019.05); *G02F 1/133311* (2021.01); *G02F 1/133317* (2021.01); *G02F 1/133325* (2021.01); *G06F 3/0412* (2013.01)

(56) References Cited

U.S. PATENT DOCUMENTS

| | | | |
|---|---|---|---|
| 9,322,981 B2 * | 4/2016 | Kim | G02F 1/133608 |
| 10,551,658 B2 * | 2/2020 | Saiki | B32B 23/04 |
| 2009/0185101 A1 * | 7/2009 | Matsuhira | G02F 1/1339 349/58 |
| 2016/0259203 A1 | 9/2016 | Nishimto et al. | |
| 2017/0315396 A1 * | 11/2017 | Saiki | B32B 3/28 |
| 2018/0113352 A1 | 4/2018 | Arita | |

FOREIGN PATENT DOCUMENTS

| | | |
|---|---|---|
| CN | 107993567 A | 5/2018 |
| CN | 108563058 A | 9/2018 |
| JP | H06148632 A | 5/1994 |
| JP | 2006184656 A | 7/2006 |

\* cited by examiner

IN-VEHICLE TOUCH DISPLAY DEVICE

1. FIELD OF DISCLOSURE

The present invention relates to a field of in-vehicle display techniques and in particular, to an in-vehicle touch display device.

2. DESCRIPTION OF RELATED ART

With development of display technology, in-vehicle touch display modules are more and more extensively used in many applications, and the modules have higher and higher standards for dustproofing. Conventional in-vehicle touch display modules are usually made by adhering a touch screen and a liquid crystal display together, and then fix them to a backlight source by an adhesive tape or glue. Due to vibration or environment conditions, ambient dust often enters the in-vehicle touch display modules during the use of the in-vehicle touch display modules, thus causing poor display quality and affecting display performance.

SUMMARY

Due to vibrations or environment conditions, ambient dust often enters conventional in-vehicle touch display modules during the use of the conventional in-vehicle touch display modules, thus causing poor display quality and affecting display performance.

It is an objective of the present invention to provide an in-vehicle touch display device which can prevent dust or particles from entering the in-vehicle touch display device, thereby improving display performance.

Accordingly, the present invention provides an in-vehicle touch display device. The in-vehicle touch display device comprises a backlight module, a touch display module, and a sealant. The touch display module is disposed over the backlight module. The touch display module comprises a touch screen, an upper polarizing film, a liquid crystal layer, and a lower polarizing film sequentially stacked on each other. The sealant joins the backlight module and the touch display module together. The sealant comprises two protrusions protruding between the backlight module and the touch display module. An adhesive layer is disposed on a side surface of the protrusion facing the lower polarizing film, wherein the adhesive layer further comprises a polyurethane portion and two double-sided adhesive tapes adhered to two side surfaces of the polyurethane portion.

One of the double-sided adhesive tapes is adhered to the side surface of the protrusion, and the other one of the double-sided adhesive tapes is not in contact with the upper polarizing film.

A thickness of the polyurethane portion is greater than a thickness of each of the double-sided adhesive tapes.

The in-vehicle touch display device further comprises an air gap layer, wherein the air gap layer is disposed between the adhesive layer and the lower polarizing film, and the air gap layer has a thickness ranging from 0.1 mm to 0.2 mm.

The sealant further comprises a light exit opening, and the light exit opening is defined between the two protrusions.

A size of the touch screen is larger than a size of the sealant, and two ends of the touch screen protrude beyond the sealant.

The touch display module further comprises an adhering layer disposed between the touch screen and the upper polarizing film, and the adhering layer is an adhesive tape or glue.

The backlight module further comprises a plurality of optical films, a metal frame for fixing the optical films, and at least one light source, and the metal frame is joined to the sealant.

The at least one light source is a light emitting diode (LED), a plurality of mini light emitting diodes (mini-LEDs), or a plurality of cold cathode fluorescent tubes, and the optical films comprise a light guide plate, a prism layer, a diffusion layer, and a reflective layer.

The present invention further provides an in-vehicle touch display device. The in-vehicle touch display device comprises a backlight module, a touch display module, and a sealant. The touch display module is disposed over the backlight module. The touch display module comprises a touch screen, an upper polarizing film, a liquid crystal layer, and a lower polarizing film sequentially stacked on each other. The sealant joins the backlight module and the touch display module together. The sealant comprises two protrusions protruding between the backlight module and the touch display module. An adhesive layer is disposed on a side surface of each protrusion facing the lower polarizing film.

The adhesive layer further comprises a polyurethane portion and two double-sided adhesive tapes adhered to two side surfaces of the polyurethane portion.

One of the double-sided adhesive tapes is adhered to the side surface of each protrusion, and the other one of the double-sided adhesive tapes is not in contact with the upper polarizing film.

A thickness of the polyurethane portion is greater than a thickness of each of the double-sided adhesive tapes.

The in-vehicle touch display device further comprises an air gap layer, wherein the air gap layer is disposed between the adhesive layer and the lower polarizing film, and the air gap layer has a thickness ranging from 0.1 mm to 0.2 mm.

The sealant further comprises a light exit opening, and the light exit opening is defined between the two protrusions.

A size of the touch screen is larger than a size of the sealant, and two ends of the touch screen protrude beyond the sealant.

The touch display module further comprises an adhering layer disposed between the touch screen and the upper polarizing film, and the adhering layer is an adhesive tape or glue.

The backlight module further comprises a plurality of optical films, a metal frame for fixing the optical films, and at least one light source, and the metal frame is joined to the sealant.

The at least one light source is a light emitting diode (LED), a plurality of mini light emitting diodes (mini-LEDs), or a plurality of cold cathode fluorescent tubes, and the optical films comprise a light guide plate, a prism layer, a diffusion layer, and a reflective layer.

Advantages of the Present Invention

The invention reduces a risk of foreign matter entering the in-vehicle touch display device by an adhesion ability of the adhesive layer, thus improving display quality, dustproof capabilities, and market competitiveness. Furthermore, the air gap layer between the adhesive layer and the lower polarizing film can prevent the liquid crystal layer from directly adhering to the adhesive layer, so that the liquid crystal layer is not affected by deformation of the backlight module to cause uneven display (optical defects), and product's ability to resist against deformation and market competitiveness are enhanced.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

References to "embodiment" in the following detailed description mean that the specific features, structures or characteristics described in connection with the embodiment may be included in at least one embodiment of the present invention. The same terms mentioned in different places in the specification are not necessarily limited to the same embodiment, but should be understood as an independent embodiment or alternative embodiments to other embodiments. In view of the technical solutions disclosed in the embodiments of the present invention, those skilled in the art should understand that the embodiments described herein may be modified or combined with other technical solutions based on the concepts of the present invention.

Figure 1:
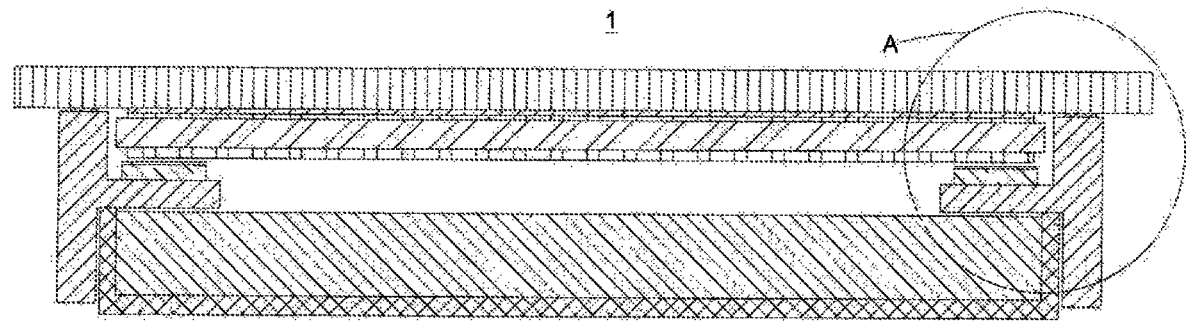
FIG. 1 is a schematic cross-sectional view illustrating an in-vehicle touch display device of the present invention.
Figure 2:
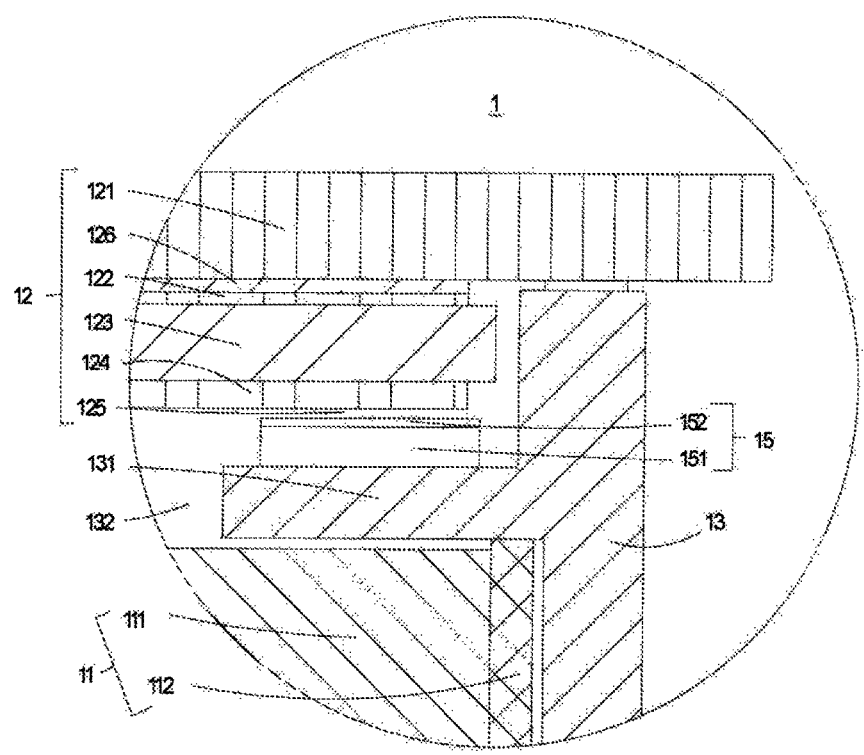
FIG. 2 is a schematic enlarged view of region A of FIG. 1.

Please refer to FIGS. 1 and 2. FIG. 1 is a schematic cross-sectional view illustrating an in-vehicle touch display device 1 of the present invention. FIG. 2 is a schematic enlarged view of region A of FIG. 1. In the embodiment shown in FIGS. 1 and 2, the present invention of the in-vehicle touch display device 1 comprises a backlight module 11, a touch display module 12, and a sealant 13. The backlight module 11 is configured to provide sufficient brightness and uniform light, so that a liquid crystal layer 123 disposed in the touch display module 12 can display images normally. A structure of the in-vehicle display device 1 is described as follows.

The touch display module 12 is disposed over the backlight module 11. The touch display module 12 comprises a touch screen 121, an upper polarizing film 122, a liquid crystal layer 123, and a lower polarizing film 124 sequentially stacked on each other. The sealant 13 comprises two protrusions 131 protruding between the backlight module 11 and the touch display module 12. An adhesive layer 15 is disposed on a side surface (not illustrated) of each protrusion 131 facing the lower polarizing film 124.

As shown in FIG. 2, the touch display module 12 further comprises an adhering layer 126 disposed between the touch screen 121 and the upper polarizing film 122. The adhering layer 126 is, for example, an adhesive tape, glue, or other suitable adhesive to enhance a bonding ability of the touch screen 121.

The backlight module 11 further comprises a plurality of optical films 111, a metal frame 112 for fixing the optical films 111, and at least one light source (not illustrated). The metal frame 112 is joined to the sealant 13 (i.e. joined to the other side surface of each protrusion 131). Since the liquid crystal layer 123 does not emit light, light is provided by the backlight module 11. The at least one light source in this embodiment is preferably a light emitting diode (LED). In another embodiment, the at least one light source may be a plurality of mini light-emitting diodes (mini-LEDs) or a plurality of cold cathode fluorescent lamps (CCFLs); configuration may vary as required. A dot Light source or a linear light source can be converted into a uniform surface light source by the optical films 111 comprising, for example, a light guide plate, a prism layer, a diffusion layer, and a reflective layer.

In the embodiment shown in FIG. 2, the adhesive layer 15 further comprises a polyurethane (PU, or so-called foam) portion 151 and two double-sided adhesive tapes 152 adhered to two side surfaces of the polyurethane portion 151. FIG. 2 only shows one double-sided adhesive tape 152. One of the double-sided adhesive tapes 152 is adhered to a side surface of the corresponding protrusion 131, and the other one of the double-sided adhesive tapes 152 is not in contact with the lower polarizing film 124. A thickness of the polyurethane portion 151 is greater than a thickness of each of the double-sided adhesive tapes 152.

Since vehicles are subject to severe vibration during drives, each protrusion 131 made of the polyurethane portion 151 and a plastic material provide buffering to avoid rigid collisions between the backlight module 11 and the liquid crystal layer 123 or the touch screen 121, thereby achieving shockproofness, shock absorption, and impact protection functions. In addition, when foreign matter, such as dust and particles enter the touch display module 12 due to vibrations or other reasons, the double-sided adhesive tape 152 of the adhesive layer 15 adheres the foreign matter to a certain extent, thereby preventing the foreign matter from entering the touch display module 12, thus improving display quality, dustproof abilities and market competitiveness.

In the embodiment shown in FIG. 2, the in-vehicle touch display device 1 further comprises an air gap layer 125, wherein the air gap layer 125 is disposed between the adhesive layer 15 and the lower polarizing film 124, and the air gap layer 125 has a thickness ranging from 0.1 mm to 0.2 mm. The air gap layer 125 prevents the touch display module 12 from being adhered by the double-sided adhesive tape 152 during vehicle vibrations, thereby protecting the liquid crystal layer 123 from being subject to local pressure due to deformation of the backlight module 11, and avoiding the liquid crystal layer 123 from being adhered to the adhesive layer 15 as a result of deformation of the backlight module 11, so that an adhering ability of the adhesive layer 15 is not reduced. Such configuration avoids poor or uneven display, so the in-vehicle touch display device 1 resists against deformation and has improved market competitiveness.

Moreover, a size of the touch screen 121 is larger than a size of the sealant 13, and two ends of the touch screen 121 protrude beyond the sealant 13. Such configuration also prevents dust, particles, or other foreign matter from entering the in-vehicle touch display device 1 through gaps between the touch screen 121 and the sealant 13. The sealant 13 is provided with a light exit opening 132. The light exit opening 132 is defined between the two protrusions 131 to allow light from the backlight module 1 to pass through the light exit opening 132 to provide sufficient illumination to the liquid crystal layer 123 and uniformly distributed light.

Although the present invention has been described in connection with the above embodiments, many alternatives, modifications, and variations are apparent to those skilled in the art. Accordingly, alternatives, modifications, and variations based on the spirit of the present invention are deemed to fall within the protection scope of the present invention.

What is claimed is:

1. An in-vehicle touch display device, comprising:
a backlight module;
a touch display module disposed over the backlight module, the touch display module comprising a touch screen, an upper polarizing film, a liquid crystal layer, and a lower polarizing film stacked sequentially on each other;
a sealant joining the backlight module and the touch display module together, the sealant comprising two protrusions protruding between the backlight module and the touch display module, wherein an adhesive layer is disposed on a side surface of the protrusion facing the lower polarizing film, and the adhesive layer further comprises a polyurethane portion and two double-sided adhesive tapes adhered to two side surfaces of the polyurethane portion;
wherein an air gap layer is disposed between the adhesive layer and the lower polarizing film, and the air gap layer has a thickness ranging from 0.1 mm to 0.2 mm.

2. The in-vehicle touch display device according to claim 1, wherein one of the double-sided adhesive tapes is adhered to the side surface of the protrusion, and the other one of the double-sided adhesive tapes is not in contact with the upper polarizing film.

3. The in-vehicle touch display device according to claim 1, wherein a thickness of the polyurethane portion is greater than a thickness of each of the double-sided adhesive tapes.

4. The in-vehicle touch display device according to claim 1, wherein the sealant further comprises a light exit opening, and the light exit opening is defined between the two protrusions.

5. The in-vehicle touch display device according to claim 1, wherein a size of the touch screen is larger than a size of the sealant, and two ends of the touch screen protrude beyond the sealant.

6. The in-vehicle touch display device according to claim 1, wherein the touch display module further comprises an adhering layer disposed between the touch screen and the upper polarizing film, and the adhering layer is an adhesive tape or glue.

7. The in-vehicle touch display device according to claim 1, wherein the backlight module further comprises a plurality of optical films, a metal frame fixing the optical films, and at least one light source, and the metal frame is joined to the sealant.

8. The in-vehicle touch display device according to claim 7, wherein the at least one light source is a light emitting diode (LED), a plurality of mini light emitting diodes (mini-LEDs), or a plurality of cold cathode fluorescent tubes, and the optical films comprise a light guide plate, a prism layer, a diffusion layer, and a reflective layer.

9. An in-vehicle touch display device, comprising:
a backlight module;
a touch display module disposed over the backlight module, the touch display module comprising a touch screen, an upper polarizing film, a liquid crystal layer, and a lower polarizing film stacked sequentially on each other;
a sealant joining the backlight module and the touch display module together, the sealant comprising two protrusions protruding between the backlight module and the touch display module, wherein an adhesive layer is disposed on a side surface of the protrusion facing the lower polarizing film;
wherein an air gap layer is disposed between the adhesive layer and the lower polarizing film, and the air gap layer has a thickness ranging from 0.1 mm to 0.2 mm.

10. The in-vehicle touch display device according to claim 9, wherein the adhesive layer further comprises a polyurethane portion and two double-sided adhesive tapes adhered to two side surfaces of the polyurethane portion.

11. The in-vehicle touch display device according to claim 10, wherein one of the double-sided adhesive tapes is adhered to the side surface of the protrusion, and the other one of the double-sided adhesive tapes is not in contact with the upper polarizing film.

12. The in-vehicle touch display device according to claim 10, wherein a thickness of the polyurethane portion is greater than a thickness of each of the double-sided adhesive tapes.

13. The in-vehicle touch display device according to claim 9, wherein the sealant further comprises a light exit opening, and the light exit opening is defined between the two protrusions.

14. The in-vehicle touch display device according to claim 9, wherein a size of the touch screen is larger than a size of the sealant, and two ends of the touch screen protrude beyond the sealant.

15. The in-vehicle touch display device according to claim 9, wherein the touch display module further comprises an adhering layer disposed between the touch screen and the upper polarizing film, and the adhering layer is an adhesive tape or glue.

16. The in-vehicle touch display device according to claim 9, wherein the backlight module further comprises a plurality of optical films, a metal frame fixing the optical films, and at least one light source, and the metal frame is joined to the sealant.

17. The in-vehicle touch display device according to claim 16, wherein the at least one light source is a light emitting diode (LED), a plurality of mini light emitting diodes (mini-LEDs), or a plurality of cold cathode fluorescent tubes, and the optical films comprise a light guide plate, a prism layer, a diffusion layer, and a reflective layer.

* * * * *